US012749666B2

(12) United States Patent
Silivra et al.

(10) Patent No.: US 12,749,666 B2
(45) Date of Patent: Sep. 29, 2026

(54) HIGH-SPEED POLARITY SWITCHING DUAL CONVERSION DYNODE ION DETECTOR FOR MASS SPECTROMETER

(71) Applicant: Thermo Finnigan LLC, San Jose, CA (US)

(72) Inventors: Oleg Silivra, Milpitas, CA (US); Linfan Li, San Jose, CA (US); Jae C. Schwartz, Gilroy, CA (US)

(73) Assignee: Thermo Finnigan LLC

( * ) Notice: Subject to any disclaimer, the term of this patent is extended or adjusted under 35 U.S.C. 154(b) by 618 days.

(21) Appl. No.: 17/935,977

(22) Filed: Sep. 28, 2022

(65) Prior Publication Data

US 2023/0105334 A1 Apr. 6, 2023

Related U.S. Application Data

(60) Provisional application No. 63/253,056, filed on Oct. 6, 2021.

(51) Int. Cl.
*H01J 49/02* (2006.01)
*H01J 43/18* (2006.01)
*H01J 49/06* (2006.01)

(52) U.S. Cl.
CPC ............ *H01J 43/18* (2013.01); *H01J 49/025* (2013.01); *H01J 49/067* (2013.01)

(58) Field of Classification Search
None
See application file for complete search history.

(56) References Cited

U.S. PATENT DOCUMENTS 3,041,453 A 6/1962 Daly
3,774,028 A 11/1973 Daly
(Continued)

FOREIGN PATENT DOCUMENTS

| | | |
|---|---|---|
| CN | 110832615 A | 2/2020 |
| CN | 112868085 A | 5/2021 |
| WO | 2005001878 A2 | 1/2005 |

OTHER PUBLICATIONS

Palacz, "An assessment of the linearity of the ion-counting Daly detector and Hamamatsu photomultiplier using NBS U500", Isotopx Technical Note T11010, https://www.isotopx.com/wp-content/uploads/2015/01/T11010-Performance-of-the-ion-counting-Daly-on-the-Phoenix-TIMS.pdf, (2015), 4 pages.
(Continued)

*Primary Examiner* — James Choi
(74) *Attorney, Agent, or Firm* — Thomas F. Cooney

(57) ABSTRACT

A dual polarity ion detector comprises: an entrance electrode disposed to receive ions and maintained at a reference voltage, $V_0$; a first dynode maintained at a voltage, $V_1$, that is negative relative to $V_0$; a second dynode maintained at a voltage, $V_2$, that is positive relative to $V_0$; a shielding electrode disposed between the first and second dynodes and maintained at a voltage, $V_3$; and an ion detector comprising an entrance aperture configured to receive first secondary particles from the first dynode and second secondary particles from the second dynode, the entrance aperture maintained at a voltage, $V_{aperture}$; that is intermediate between the voltage, $V_1$, and the voltage, $V_2$. In some instances, the voltage, $V_3$, may be equal to or approximately equal to the voltage, $V_0$.

11 Claims, 8 Drawing Sheets

(56) References Cited

U.S. PATENT DOCUMENTS

| | | | | |
|---|---|---|---|---|
| 4,066,894 | A | 1/1978 | Hunt et al. | |
| 4,423,324 | A | 12/1983 | Stafford | |
| 4,896,035 | A | 1/1990 | Mahoney et al. | |
| RE33,344 | E | 9/1990 | Stafford | |
| 5,420,425 | A * | 5/1995 | Bier | H01J 49/423 250/282 |
| 5,464,975 | A | 11/1995 | Kirchner et al. | |
| 5,576,540 | A | 11/1996 | Jolliffe | |
| 5,773,822 | A | 6/1998 | Kitamura et al. | |
| 6,617,768 | B1 | 9/2003 | Hansen | |
| 6,737,644 | B2 | 5/2004 | Itoi | |
| 7,427,752 | B2 | 9/2008 | Jones et al. | |
| 7,456,398 | B2 | 11/2008 | Senko et al. | |
| 7,714,299 | B2 | 5/2010 | Wang et al. | |
| 7,728,292 | B2 | 6/2010 | Jolliffe et al. | |
| 8,866,071 | B2 | 10/2014 | Kotani et al. | |
| 9,524,855 | B2 | 12/2016 | Schoen et al. | |
| 10,468,239 | B1 | 11/2019 | Steiner et al. | |
| 10,593,534 | B2 | 3/2020 | Verenchikov | |
| 2008/0067361 | A1 * | 3/2008 | Senko | H01J 43/02 250/292 |
| 2008/0073530 | A1 | 3/2008 | Jolliffe et al. | |
| 2008/0116368 | A1 * | 5/2008 | Uchiyama | H01J 37/244 257/E29.069 |
| 2011/0095177 | A1 | 4/2011 | Giannakopulos et al. | |
| 2013/0187057 | A1 | 7/2013 | Kobayashi et al. | |
| 2017/0025265 | A1 | 1/2017 | Verenchikov et al. | |
| 2021/0210330 | A1 | 7/2021 | Verenchikov | |
| 2021/0343517 | A1 | 11/2021 | Kobayashi et al. | |

OTHER PUBLICATIONS

Pajo, "UO2 Fuel Pellet Impurities, Pellet Surface Roughness and N(18O)/n(16O) Ratios, Applied to Nuclear Forensic Science", Dissertation, University of Helsinki, Faculty of Science, Department of Chemistry, URL: https://helda.helsinki.fi/handle/10138/21067, 2001, 69 pages.

Anonymous, "Ion Collectors and Detectors", URL: https://slidetodoc.com/ion-collectors-and-detectors-some-ideal-characteristics-of/, 9 pages.

Gates,"Ion Detectors", University of Bristol, School of Chemistry, Mass Spectrometry Facility, URL: http://www.chm.bris.ac.uk/ms/detectors.xhtml, 2014, 2 pages.

Daly, "Scintillation Type Mass Spectrometer Ion Detector", The Review of Scientific Instruments, vol. 31 (3), 1960, pp. 264-267.

Hofer et al., "A Simple Axially-Symmetric Quadrupole Sims Spectrometer", Nuclear Instruments and Methods 149 (1978), pp. 535-541.

Extended EP Search Report mailed on Feb. 27, 2023, to EP Patent Application No. 22199750.5.

He et al. "Dual-Polarity Ion Trap Mass Spectrometry: Dynamic Monitoring and Controlling Gas-phase Ion-Ion Reactions" Journal American Society Mass Spectrometry, 2017, vol. 28, pp. 1262-1270.

Dietz, Leonard A. "Basic Properties of Electron Multiplier Ion Detection and Pulse Counting Methods in Mass Spectrometry" The Review of Scientific Instruments, Dec. 1965, vol. 36, No. 12, pp. 1763-1770.

* cited by examiner

20

20

HIGH-SPEED POLARITY SWITCHING DUAL CONVERSION DYNODE ION DETECTOR FOR MASS SPECTROMETER

CROSS REFERENCE TO RELATED APPLICATION

This application claims, under 35 U.S.C. 119(e), priority to and the benefit of the filing date of U.S. Provisional Application No. 63/253,056, which was filed on Oct. 6, 2021 and which is titled "High-Speed Polarity Switching Dual Conversion Dynode Ion Detector for Mass Spectrometer," the disclosure of which is hereby incorporated herein by reference in its entirety. This application is also related to and commonly assigned U.S. patent application Ser. No. 17/037,270, titled "Daly Detector Operable in Negative Ion and Positive Ion Detection Modes", filed on Sep. 29, 2020, the disclosure of which is hereby incorporated by reference herein in its entirety.

TECHNICAL FIELD

The present disclosure relates to mass spectrometry. More particularly, the present invention relates to ion detectors used in mass spectrometry.

BACKGROUND

The ion detector configuration which comprises a conversion dynode in front of an electron multiplier (EM) is very popular for use in various types of mass spectrometer systems, such as state-of-the-art single and triple quadrupole, ion trap systems, and hybrid mass spectrometer systems comprising more than one type of mass analyzer. As an example, FIG. 1 schematically illustrates a triple-quadrupole mass spectrometer system, as generally designated by the reference numeral 1, that may employ an electron multiplier detector 10. The operation of mass spectrometer 1 and collection and analysis of data 11 can be controlled by a control and data system implemented as one or more programmable processors 93. The one or more programmable processors 93 may comprise any one or a combination of general-purpose computers or special-purpose processors (digital signal processor (DSP)), firmware and/or software to provide instrument control and data analysis for mass spectrometers and/or related instruments. A sample containing one or more analytes of interest can be ionized via an ion source 5 operating at or near atmospheric pressure. The resultant ions are directed via ion optics that often can include tube lenses, skimmers, and multipoles, e.g., reference characters 6 and 7, so as to be urged through a series of chambers, e.g., chambers 2, 3 and 4, of progressively reduced pressure that operationally guide and focus such ions to provide good transmission efficiencies. The various chambers communicate with corresponding ports 12 (represented as arrows in FIG. 1) that are coupled to a set of vacuum pumps (not shown) to maintain the pressures at the desired values.

The example mass spectrometer system 1 of FIG. 1 is illustrated with a triple-stage configuration 8 within a high vacuum chamber 9, the triple-stage configuration having sections labeled Q1, Q2 and Q3 electrically coupled to one or more power supplies 91. The Q1, Q2 and Q3 stages may be operated, respectively, as a first quadrupole mass filter, a fragmentation cell, and a second quadrupole mass filter. Ions that are either filtered, filtered and fragmented or fragmented and filtered within one or more of the stages are passed to the detector 10. Such a detector may be beneficially placed at the channel exit of the final quadrupole (e.g., Q3 of FIG. 1) to provide data that can be processed into a rich mass spectrum 11 showing the variation of ion abundance with respect to m/z ratio. During conventional operation of a multipole mass filter, such as the quadrupole mass filter Q3 shown in FIG. 1, to generate a mass spectrum, the detector 10 is used to measure the quantity of ions that pass completely through the mass filter as a function of time while the RF and DC voltage amplitudes are scanned.

In general, the various operations of components of the mass spectrometer system 1 may be controlled by the application of and/or adjustment of voltages supplied to various electrodes of the mass spectrometer system by the one or more power supplies 91. Such electrodes include not only electrodes of the triple quadrupole components Q1, Q2 and Q3 but also of the ion source 5, the detector 10 and various ion optical lenses, guides and gates (not specifically shown) that control the flow of ions through the mass spectrometer system 1. The timing and magnitude of application of the application and/or adjustment of such voltages may be controlled by means of electronic or other electrical signals sent to the one or more power supplies by the one or more programmable processors under the logical control of computer-readable instructions of the one or more programmable processors 93. The computer-readable instructions may be configured to cause the one or more programmable processors 93 to provide signals to the one or more power supplies 91 that cause the one or more power supplies to apply voltages to the electrodes of the mass spectrometer system 1 that cause the system to implement desired analysis methods or procedures. In particular, the computer-readable instructions may be configured so that the mass spectrometer system implements methods in accordance with the present teachings.

Frequently, the detector 10 of the mass spectrometer 1 is an electron-multiplier-type of detector, such as the continuous-dynode electron multiplier 10.1 that is illustrated in FIG. 2. The continuous dynode electron multiplier 10.1 generally comprises a tube-like structure 15 that is housed within a vacuum chamber 13 and that has an inlet end 14 and a narrower outlet end 19. The internal surface 12 of the interior 17 of the tube-like structure is coated with an electron-emissive material, such as BeO or MgO, that can emit secondary electrons in response to impacts by charged particles. Any emitted secondary electrons are urged towards the outlet end 19 of the apparatus by an electrical potential profile that increases towards the outlet end (bottom half of FIG. 2). In operation, an incident beam 16 of ions is directed into the inlet end 14 of the apparatus along a direction that causes the ions to impact the internal surface 12. In response to the impacts by the ions, a small number of electrons are dislodged from the electron-emissive material along a plurality of electron trajectories 18. The internal surface 12 is shaped in the form of a truncated cone or a curved truncated cone such that most secondary electron trajectories 18 cause the secondary electrons to further impact the internal surface, thus generating a greater number of electrons that proceed along a greater number of secondary electron trajectories. Multiple impacts of secondary electrons with the internal surface 12 can cause amplification of the original ion current by a factor of up to one million. The amplified current, represented by a multitude of electrons, exits the apparatus through its outlet end 19 and is detected by a charge detector.

Alternatively, the detector 10 may be of a type that utilizes a high energy dynode multiplier such as, for example, mass spectrometer detectors that are commercially available from Adaptas Solutions of Clyde, New South Wales, Australia. These detectors employ a high voltage (±10 kV) that is applied to the conversion dynode to accelerate the ions prior to their interaction with the dynode surface. Such detectors are able to detect both positive and negative ions and are designed to be sensitive to a very wide range of ion energies. Secondary ions emitted by the dynode are mostly electrons in positive ion detection mode, and are generally positively charged particles (mostly protons and light positive fragment ions) in negative ion detection mode.

There is a long-standing trend, in the development of mass spectrometry instrumentation, of increasing the rate of analytical data generation so as to generate more and more analyses in less and less time. Depending upon the type(s) of sample(s) being analyzed and the data requirements of an analyst, it may be necessary to switch between or alternate between analyses of positively charged ions and analyses of negatively charged ions. Accordingly, the opportunity to reduce the time required for a mass spectrometer to switch from measurements of a first ion polarity to measurements of the opposite polarity is being actively pursued and has resulted in a recent change of industry standard polarity-switching time from 25 milliseconds to 5 milliseconds. There is no doubt that this process will not stop before reaching the ultimate physical limits even for a price of increasing cost of corresponding hardware.

One possible method for reducing polarity switching time is to couple the detector to polarity-switching power supplies having a switching time on the order of the time required to switch or slew the voltages of various internal mass spectrometer components. However, the conversion dynode in the detector typically has an applied voltage of more than 10 kV in magnitude, so such a solution is associated with the disadvantages of high cost, especially with polarity-switching times approaching 1 ms; high power consumption with concomitant increased cooling requirements; and increased size. Accordingly, there remains a need in the art for development of detector configurations that approach the ultimate polarity-switching speed without introducing these disadvantageous effects.

SUMMARY

In order to address the above needs in the art, this disclosure describes apparatuses and methods that utilize a combination of conventional conversion dynodes and electron multipliers while nonetheless allowing for a significant reduction of polarity switching time of mass spectrometer detection systems. The following summary presents a simplified description of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

According to a first aspect of the present teachings, an ion detector that can detect either positive or negative ions is disclosed, the ion detector comprising:

- an entrance electrode disposed to receive ions and maintained at a reference voltage, $V_0$;
- a first dynode maintained at a voltage, $V_1$, that is negative relative to $V_0$;
- a second dynode maintained at a voltage, $V_2$, that is positive relative to $V_0$;
- a shielding electrode disposed between the first and second dynodes and maintained at a voltage, $V_3$; and
- an ion detector comprising an entrance aperture configured to receive first secondary particles from the first dynode and second secondary particles from the second dynode, the entrance aperture maintained at a voltage, $V_{aperture}$; that is intermediate between the voltage, $V_1$, and the voltage, $V_2$.

In some instances, the voltage, $V_3$, may be equal to or approximately equal to the voltage, $V_0$.

According to a second aspect of the present teachings, a method of detecting ions is disclosed, the method comprising:

- transferring a first batch of ions having a first charge polarity from a mass analyzer to a detector;
- directing the first batch of ions to a first dynode of the detector;
- generating a first set of secondary particles from the first dynode in response to impingement of the first batch of ions onto the first dynode;
- directing the first set of secondary particles to a charge detection device and using the charge detection device to detect a quantity of charge carried by the first set of secondary particles;
- transferring a second batch of ions having a second charge polarity opposite to the first charge polarity from the mass analyzer to the detector;
- directing the second batch of ions to a second dynode of the detector;
- generating a second set of secondary particles from the second dynode in response to impingement of the second batch of ions onto the second dynode, the second secondary particles different from the first set of secondary particles; and
- directing the second set of secondary particles to the charge detection device and using the charge detection device to detect a quantity of charge carried by the second set of secondary particles.

The apparatuses and methods taught herein are the most beneficial for mass spectrometer systems in which the polarity-switching speed of the detection system is the rate-limiting step in terms of the overall ability of the system to switch or alternate between analyses of positive and negative ions. The apparatuses and methods taught herein may also provide the benefits of a robust and low-cost polarity-switching design to many other mass spectrometry systems.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1:
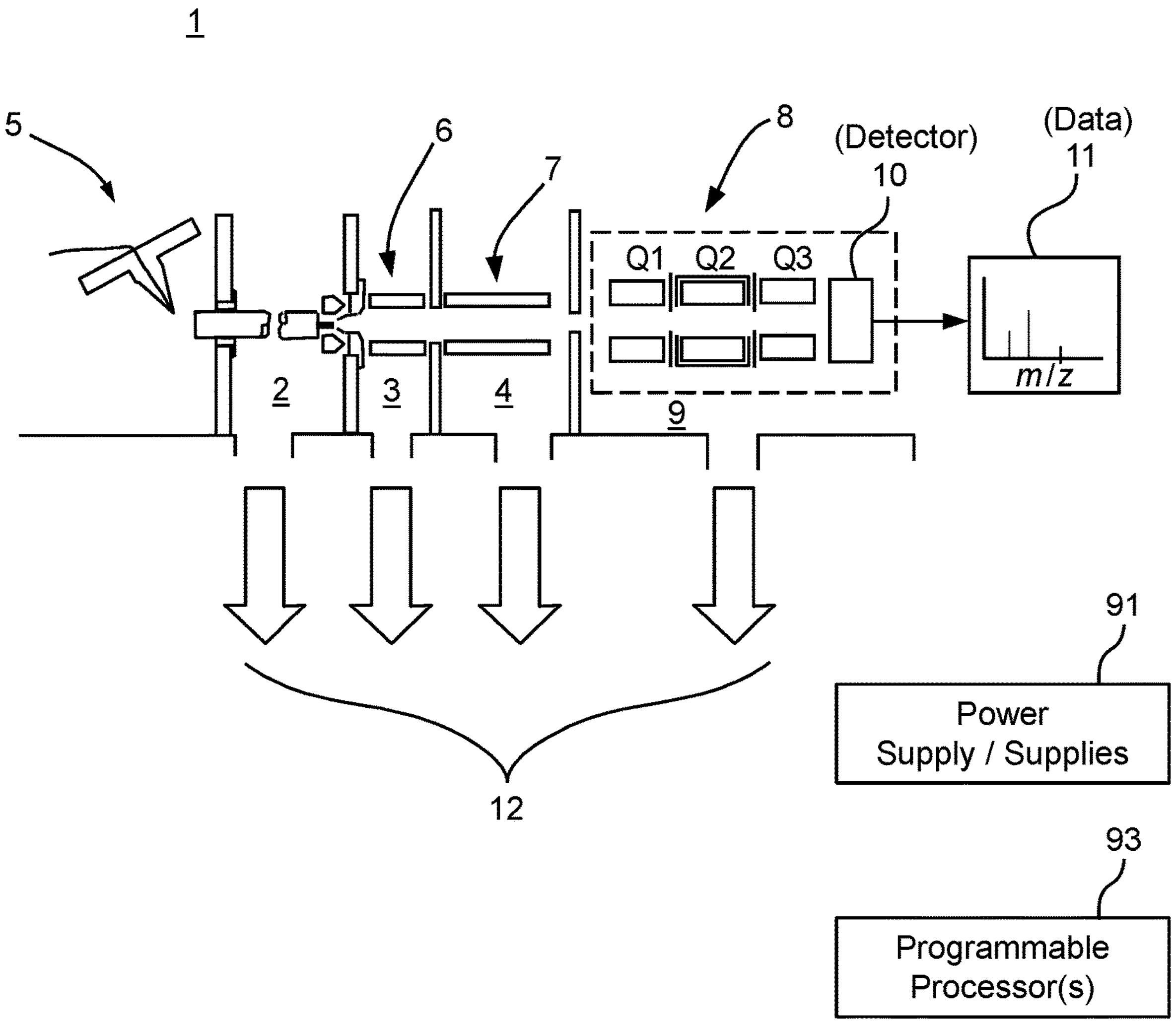
FIG. 1 (Prior Art)
FIG. 1 is a schematic illustration of a triple-quadrupole mass spectrometer system.
Figure 2:
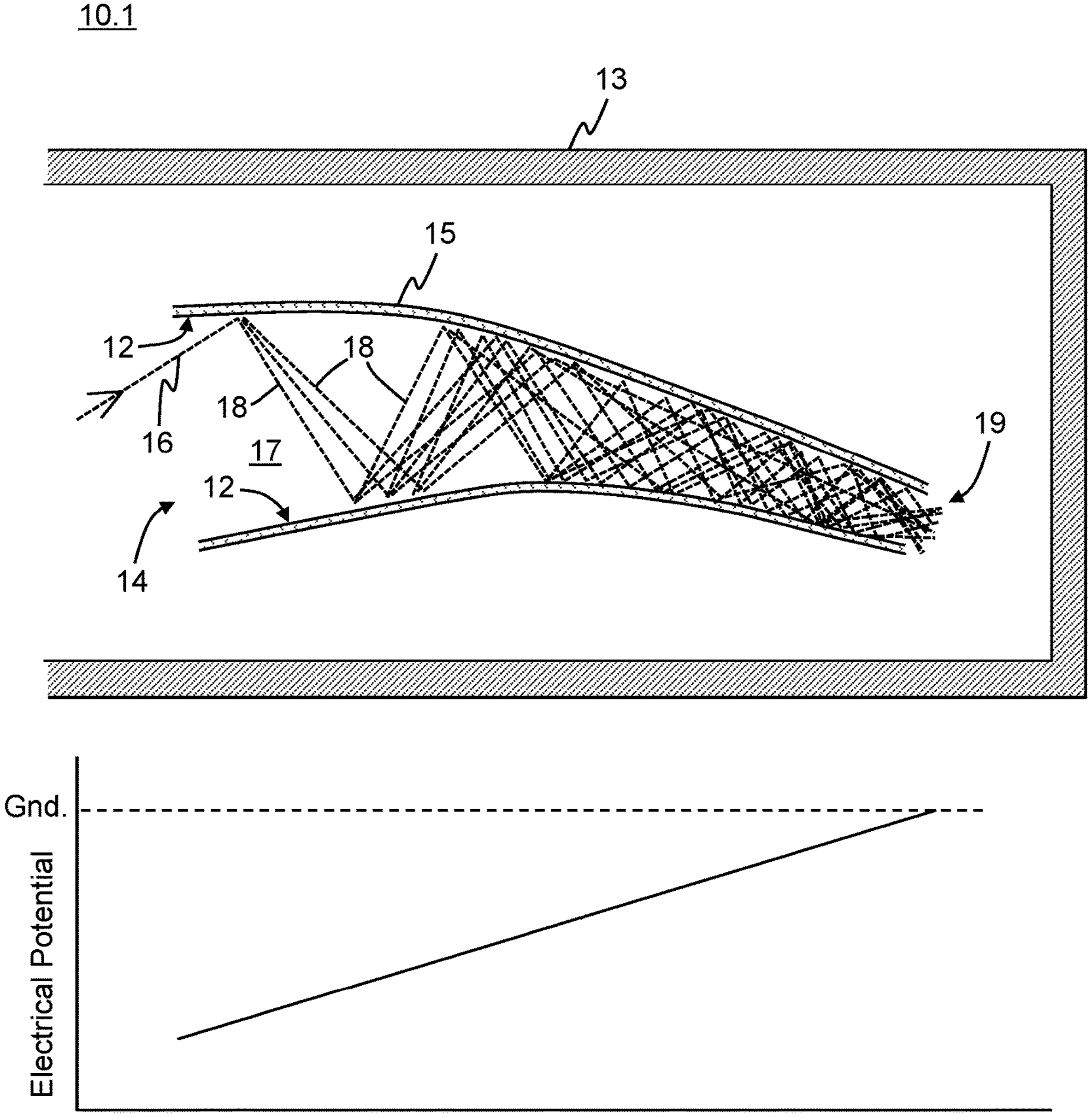
FIG. 2 (Prior Art)
FIG. 2 is a schematic depiction of a conventional continuous-dynode electron multiplier detector for a mass spectrometer system.

The following description is presented to enable any person skilled in the art to make and use the invention and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features and advantages of the present invention in greater detail, please refer to FIGS. 1-3, 4A-4B, 5A-5B, 6 and 7 in conjunction with the following discussion.

In the description of the invention herein, it is understood that a word appearing in the singular encompasses its plural counterpart, and a word appearing in the plural encompasses its singular counterpart, unless implicitly or explicitly understood or stated otherwise. Unless otherwise stated, the word "substantially", when used in this document so as to indicate that a quantity X is "substantially" a quantity Y, should be understood to mean that the quantity X is equal to the quantity Y within a five percent tolerance. Furthermore, it is understood that, for any given component or embodiment described herein, any of the possible candidates or alternatives listed for that component may generally be used individually or in combination with one another, unless implicitly or explicitly understood or stated otherwise. It will be understood that any list of candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements.

As used herein, the term "DC", when referring to a voltage applied to one or more electrodes of a mass spectrometer component (such as an ion funnel), does not necessarily imply the imposition of or the existence of an electrical current through those electrodes but is used only to indicate that the referred-to applied voltage either is static or, if non-static, is non-oscillatory and non-periodic. The term "DC" is thus used herein to distinguish the referred-to voltage(s) from applied periodic oscillatory voltages, which themselves may be referred to as either "RF" or "AC" voltages.

Figure 3:
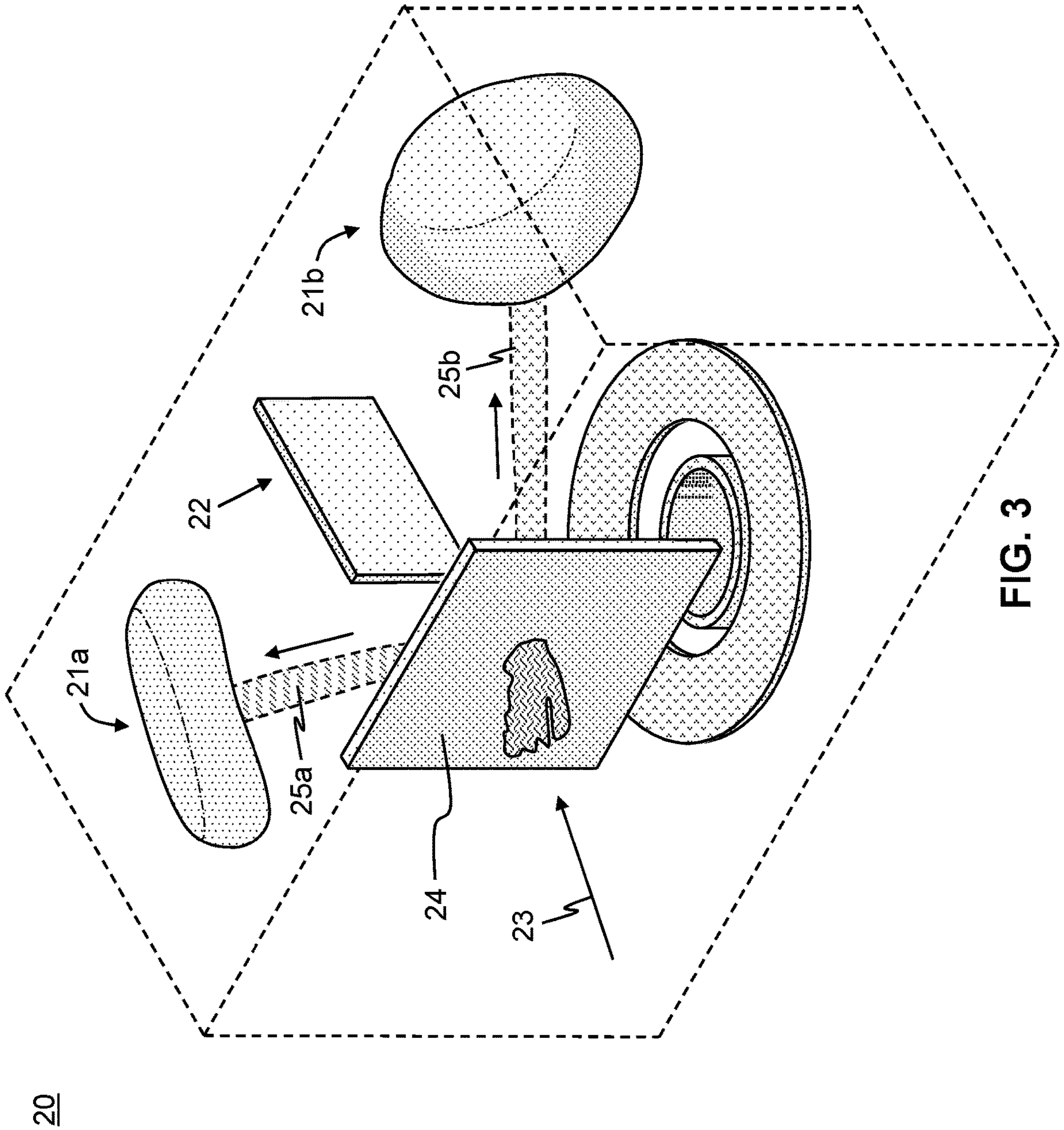
FIG. 3 is a schematic perspective view of a novel ion detector in accordance with the present teachings, showing the separate trajectories of incoming positively charged and negatively charged ions.
Figure 4A:
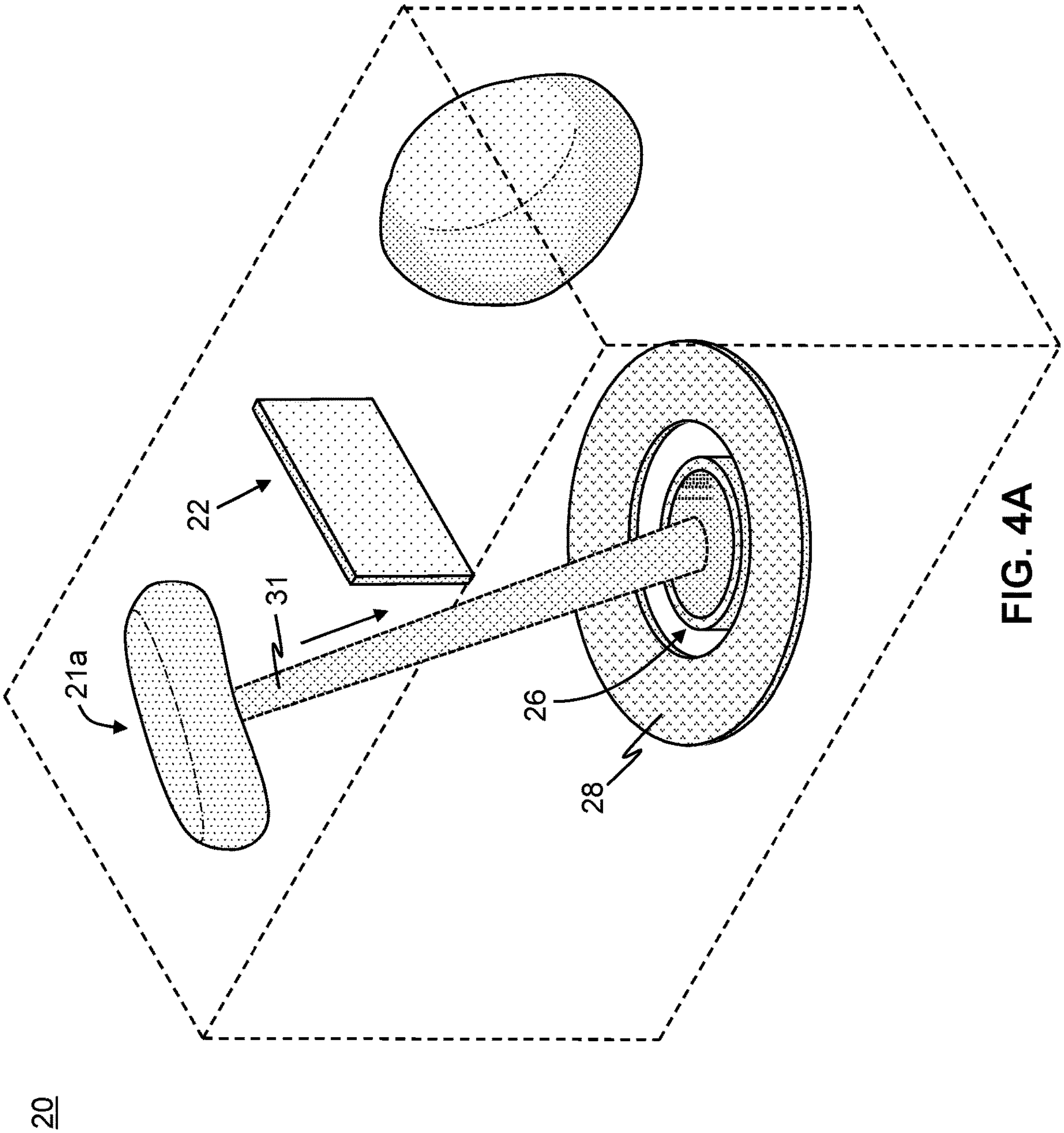
FIG. 4A is a schematic perspective view of the novel ion detector of FIG. 3, showing trajectories, through the apparatus, of secondary electrons generated by the impact of positively charged ions onto one of two separate dynodes of the apparatus.
Figure 5B:
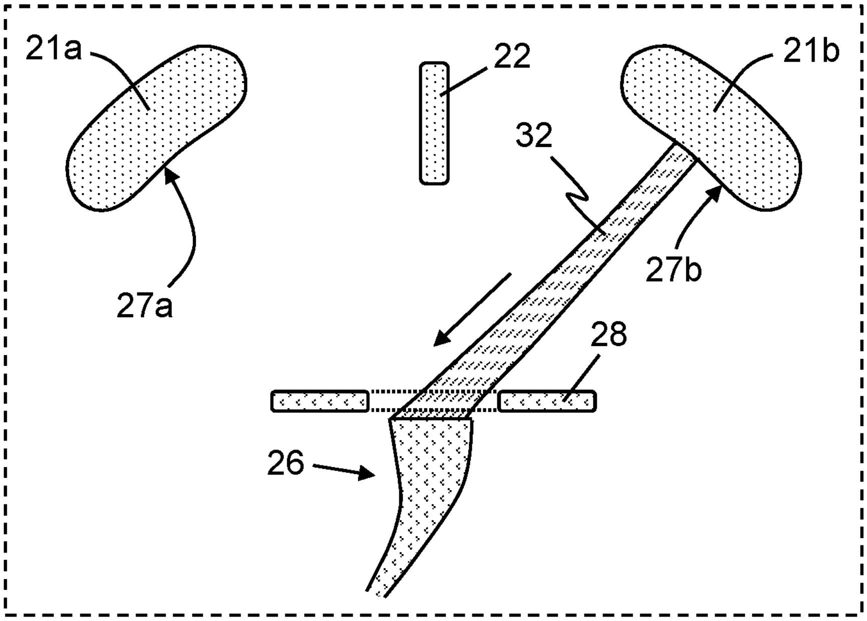
FIG. 5B is a side elevation view of the secondary-particle trajectories of FIG. 5A.
Figure 5A:
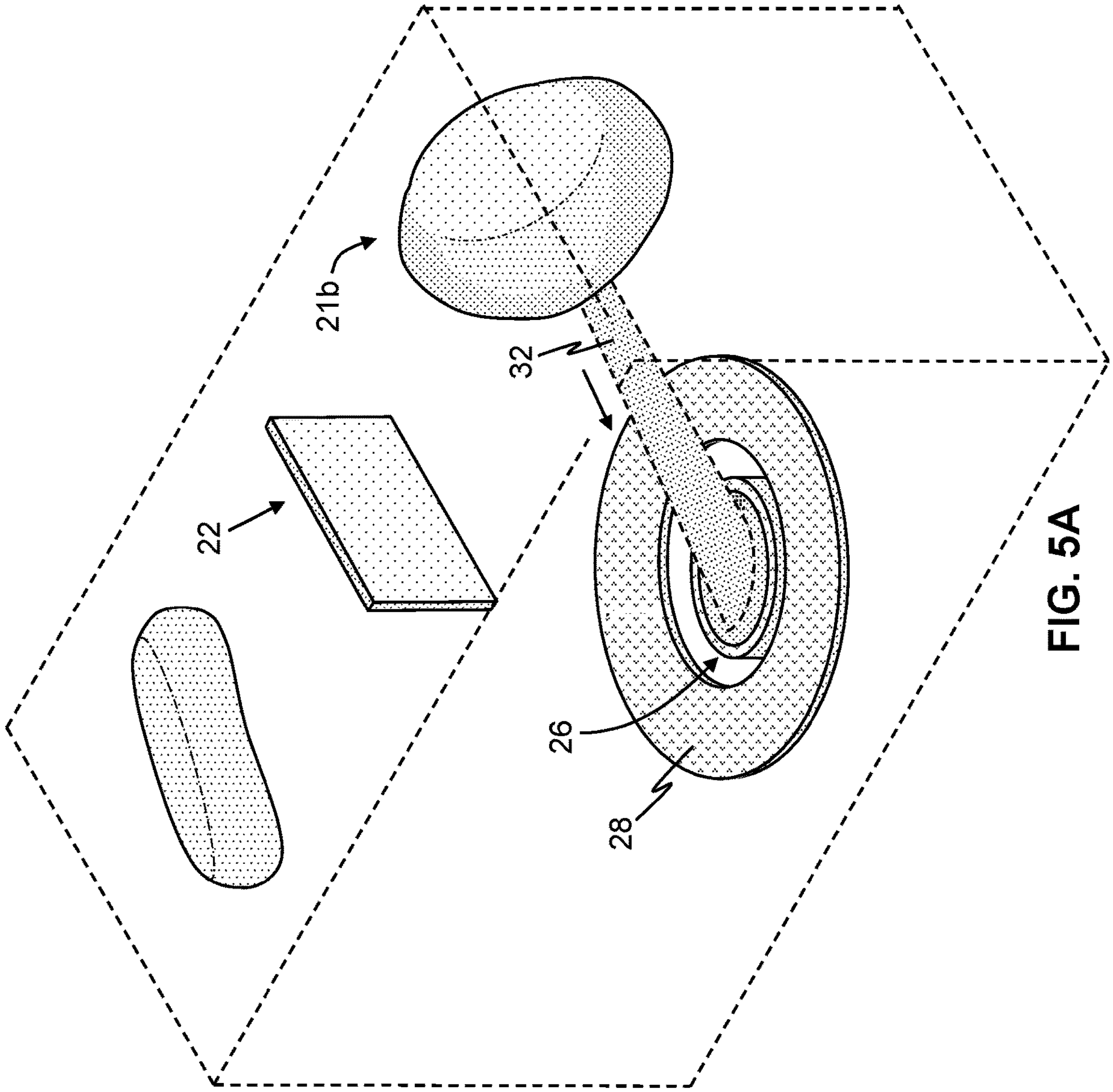
FIG. 5A is a schematic perspective view of the novel ion detector of FIG. 3, showing trajectories, through the apparatus, of positively charged secondary particles generated by the impact of negatively charged ions onto another one of the two separate dynodes of the apparatus.

FIG. 3 is a schematic perspective view of a novel dual polarity ion detector 20 in accordance with the present teachings, showing the separate trajectories of incoming positively charged and negatively charged ions. It should be noted that the dashed lines that outline a box in FIG. 3 as well as in FIGS. 4A and 5A are provided for visual perspective only and do not necessarily comprise any part of the apparatus 20. A novel aspect of the dual polarity detector 20 is the simultaneous use of two conversion dynodes 21*a*, 21*b*, which are energized, when the apparatus 20 is used as a dual-polarity detector, with electrical potentials of opposite polarity and equal magnitude. During such operation, each dynode is energized by a respective dedicated power supply. As discussed in greater detail below, the dynodes and other electrodes are positioned in such a way that ions leaving a mass analyzer automatically follow a path to the particular dynode that is appropriate for the ions' respective polarity. Accordingly, there is no need for voltage switching.

In operation of the detector 20, a stream of ions 23 that is delivered from a mass analyzer (e.g., a quadrupole mass analyzer; not shown in FIG. 3) located at the left of the diagram pass through an entrance electrode 24 that is preferably maintained at ground potential $V_0$ (e.g., at zero volts). The entrance electrode 24 may be a shielding electrode that shields charged particles within the detector 20 from the influence of external electric fields and/or that assists in shielding charged particles in one portion of the detector from the influence of electric fields in another portion of the detector. Optionally, the entrance electrode 24 may comprise an ion focusing lens to which the polarity of an applied voltage changes according to the polarity of the stream of ions 23 that passes through it. When the detector 20 is operated as a dual-polarity detector, the ions of stream 23 encounter, after passing through the entrance electrode 24, a divergent electric field that is created by the positioning of a second shielding electrode 22 that may be maintained at ground potential. Thus, positive ions are attracted towards conversion dynode 21*a*, which is maintained at a negative electrical potential, along first ion pathway 25*a*. Likewise, negative ions are attracted towards conversion dynode 21*b*, which is maintained at a positive electrical potential, along second ion pathway 25*b*. Preferably, the second shielding electrode 22 is disposed midway between the two dynodes 21*a*, 21*b*.

Figure 4B:
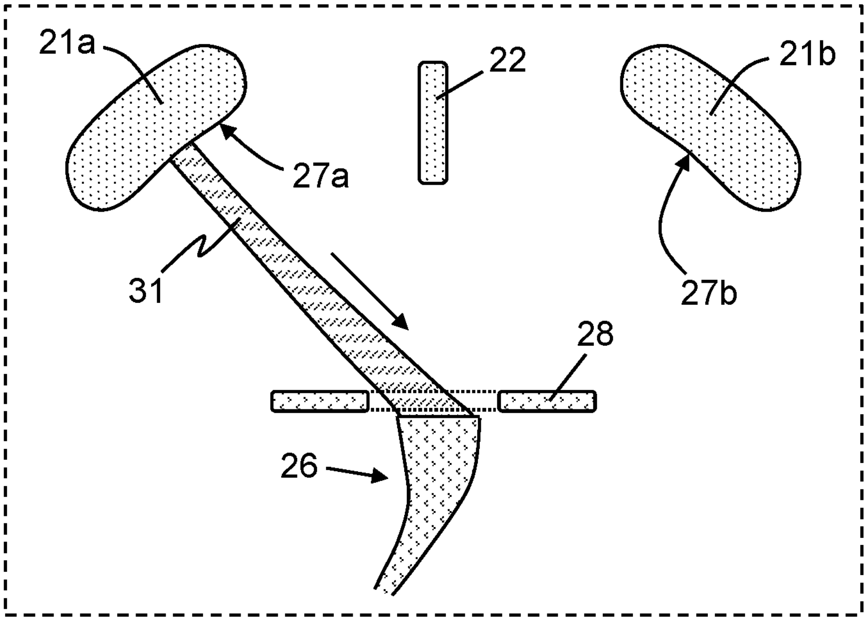
FIG. 4B is a side elevation view of the secondary-particle trajectories of FIG. 4A.

The trajectories of primary ions and secondary ions and electrodes through the apparatus 20 were simulated using SIMION™ 8.1 electric field and charged-particle trajectory modeling software that is commercially available from Adaptas Scientific Instrument Services of Palmer, Massachusetts, USA. The results of the simulations are presented on FIGS. 3, 4A, 4B, 5A and 5B. In the simulations, the dynodes 21*a*, 21*b* were maintained at −12 kV and +12 kV, respectively, the two electrodes 22, 24 were maintained at 0 V and the entrance aperture of the electron multiplier 26 (FIGS. 4A, 4B, 5A, 5B) was maintained at −2 kV. The simulations were performed for ions of within the mass-to-charge (m/z) range of 50-2000 Th and a kinetic energy range of 1 eV to 10 eV. The presence of the electrode 22 assists in creating a favorable field distribution that minimizes ion losses and prevent potential crosstalk between dynodes. The simulated trajectories of primary ions (i.e., the ions received from a mass spectrometer) within the detector 20 are represented in FIG. 3 as first and second ion pathways 25*a*, 25*b*, relating to positive and negative ions, respectively. The secondary particles generated at either one of the dynodes 21*a*, 21*b* are directed to an electron multiplier 26 (FIGS. 4A, 4B, 5A, 5B) which acquires data in a conventional manner. It has been found that, for best operation, it is preferable that each one of the dynodes 21*a*, 21*b* has a concave surface that faces the electron multiplier 26 (FIGS. 4B, 5B). For instance, concave surface 27*a* of dynode 21*a* faces the electron multiplier 26 and, likewise, concave surface 27*b* of dynode 21*b* also faces the electron multiplier 26. Such surface configurations provide a degree of focusing of emitted secondary particles towards the electron multiplier.

For example, secondary electrons are generated when the positive primary ions that follow the first ion pathway 25*a* impact the surface of dynode 21*a*. These secondary electrons are then drawn towards an entrance aperture of the electron multiplier 26, along electron pathway 31 (FIGS. 4A, 4B) as a result of the fact that the entrance aperture of the electron multiplier 26 is at a potential (−2 kV) that is more positive than the potential of (−12 kV) of the dynode 21*a*. With very few exceptions, the simulation results indicate that most of these secondary electrons move toward the multiplier receiving location. The orientation and position of the dynodes and the positioning of the shielding electrode 22 ensures impressive trajectory convergence toward the entrance aperture.

Alternatively, secondary positive ions are generated when the negative primary ions that follow the second ion pathway 25*b* impact the surface of dynode 21*b*. According to the simulation, these secondary ions were modeled as comprising a plurality of positive ion species having m/z ratios ranging from 1 Th to 100 Th. These secondary positive ions are also drawn towards the entrance aperture of the electron multiplier 26, along secondary ion pathway 32 (FIGS. 5A, 5B) as a result of the fact that the entrance aperture is at a potential (−2 kV) that is more negative than the potential (+12 kV) of the dynode 21*b*.

As shown in FIGS. 4A, 4B, an additional lens electrode or electrode assembly 28 may be disposed adjacent to the entrance aperture of the electron multiplier 26. When present, the lens electrode 28 assists in focusing either a beam of secondary electrons 31 or a beam of secondary positive ions 32 into the entrance aperture of the electron multiplier. Although the lens electrode or electrode assembly 28 is depicted as a simple ring electrode, the shape of lens electrode 28 may be modified in order to successfully capture incoming secondaries within the electron multiplier 26. In alternative embodiments, the electron multiplier 26 may be replaced by any suitable electrometer apparatus.

Figure 6:
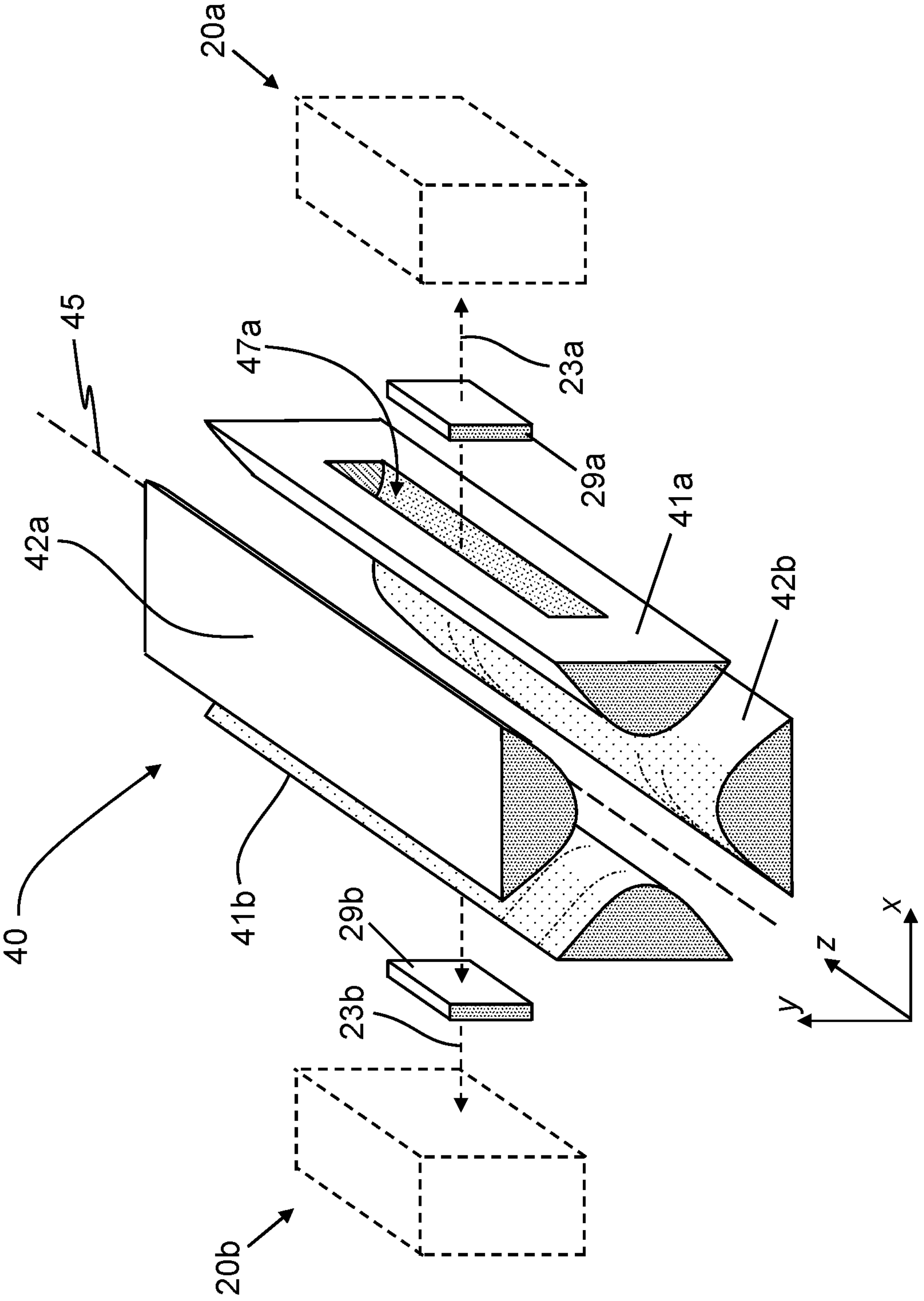
FIG. 6 is a schematic perspective depiction of interfacing two instances of the novel detector of FIG. 3 to a linear ion trap mass analyzer.

Furthermore, a separate lens may be required between a mass analyzer and the detector 20 in order to appropriately focus and capture an incoming beam 23 of ions, especially when the mass analyzer is other than a quadrupole mass filter. For example, FIG. 6 is a schematic perspective depiction of a system in accordance with the present teachings in which two instances of the dual polarity detector 20, the two instances herein denoted as detectors 20*a* and 20*b*, are interfaced to a single linear ion trap mass analyzer 40 comprising four mutually parallel rod electrodes 41*a*, 41*b*, 42*a*, 42*b*. A longitudinal z-axis is defined by the long dimensions of the rod electrodes. A first pair of the rod electrodes 41*a*, 41*b*, herein referred to as "x-rods", are separated, one from the other, along a transverse x-axis. A second pair of the rod electrodes 42*a*, 42*b*, herein referred to as "y-rods", are separated, one from the other, along a transverse y-axis that is orthogonal to both the x-axis and the z-axis as shown. Ions may be trapped, in known fashion, within the linear ion trap 40, by application of radio-frequency (RF) voltage waveforms to the rod electrodes, with the phase of the voltage waveform applied to the y-rods being $\pi$ radians out of phase with the voltage waveform applied to the x-rods.

Generally, in operation of the linear ion trap 40 as a mass analyzer, ions may be ejected, in order of their mass-to-charge (m/z) values, through slots in the rod electrodes. For example, the linear ion trap mass analyzer 40 is illustrated, in FIG. 6, as comprising such slots in each of the rod electrodes 41*a*, 41*b*. However, only one such slot 47*a* is specifically illustrated in the drawing. As is known, ions may be selectively ejected from the linear ion trap 40 through the two slots by application of an auxiliary oscillatory dipolar AC voltage waveform across the two electrodes having the slots. According to this operation, a separate stream of ions will be ejected from each slot, with the two streams of ions being ejected in opposite directions. For example, as shown in FIG. 6, approximately one-half of the ejected ions will be ejected from slot 47*a* in rod electrode 41*a* in ion stream 23*a* and the remaining approximate one-half of the ejected ions will be ejected in the opposite direction, along ion stream 23*b*, from a matching slot (not shown) in rod electrode 41*b*. Accordingly, two dual polarity detectors 20*a*, 20*b* are disposed so as to capture and detect the ions of ion stream 23*a* and ion stream 23*b*, respectively. Because ions are ejected from the linear ion trap along the entire length of each slot, the cross sections of the ion streams 23*a*, 23*b* will generally not match the ion acceptance apertures of the detectors 20*a*, 20*b*. To compensate for this mismatch, ion lenses (e.g., Einzel lenses) 29*a*, 29*b* may be disposed between the ion trap and each detector to shape and collimate each ion stream.

One of benefits of the design of the dual polarity detector 20 is an automatic, passive switching of the detection system between the two polarities. As contemporary mass spectrometers are effectively filtering ions of opposite polarity there is no concern that ions of opposite polarities can contribute to the signal simultaneously. Another benefit is the speed of polarity switching that may be achieved. Specifically, the expected "polarity switching time" for such detection system will be of the order of the sum of ion flight time and signal generation time, and in some cases may be estimated as long as a few microseconds. Yet another benefit is that the high voltage power supplies that are coupled to the conversion dynodes 21*a*, 21*b* work in constant polarity and constant voltage mode. The elimination of any requirement to implement polarity switching of the one or more power supplies 91 results in a much simpler design. This, in turn, translates into more robust performance and much-reduced hardware cost. Yet another benefit is that single polarity constant voltage power supplies are much more compact, consume much less power and have less stringent cooling requirements as compared to switchable power supplies.

In known existing dual polarity detection systems, the voltage applied to the electron multiplier in the positive ion detection mode differs, by a few hundred volts, relative to the voltage that is applied to the electron multiplier in the negative ion detection mode. As a result, the power supply is required to have a voltage slew rate above some critical value in order to comply with the speed of polarity switching. In contrast, the novel dual-polarity detector taught herein may be operated by applying different magnitude potentials to the dynodes of different polarity. Further, different dynode coatings (such as boron-doped diamond coating for the negative polarity dynode) may be applied to the separate dynodes. This brings yet another benefit in the form of robustness and reduced cost of the multiplier power supply.

Figure 7:
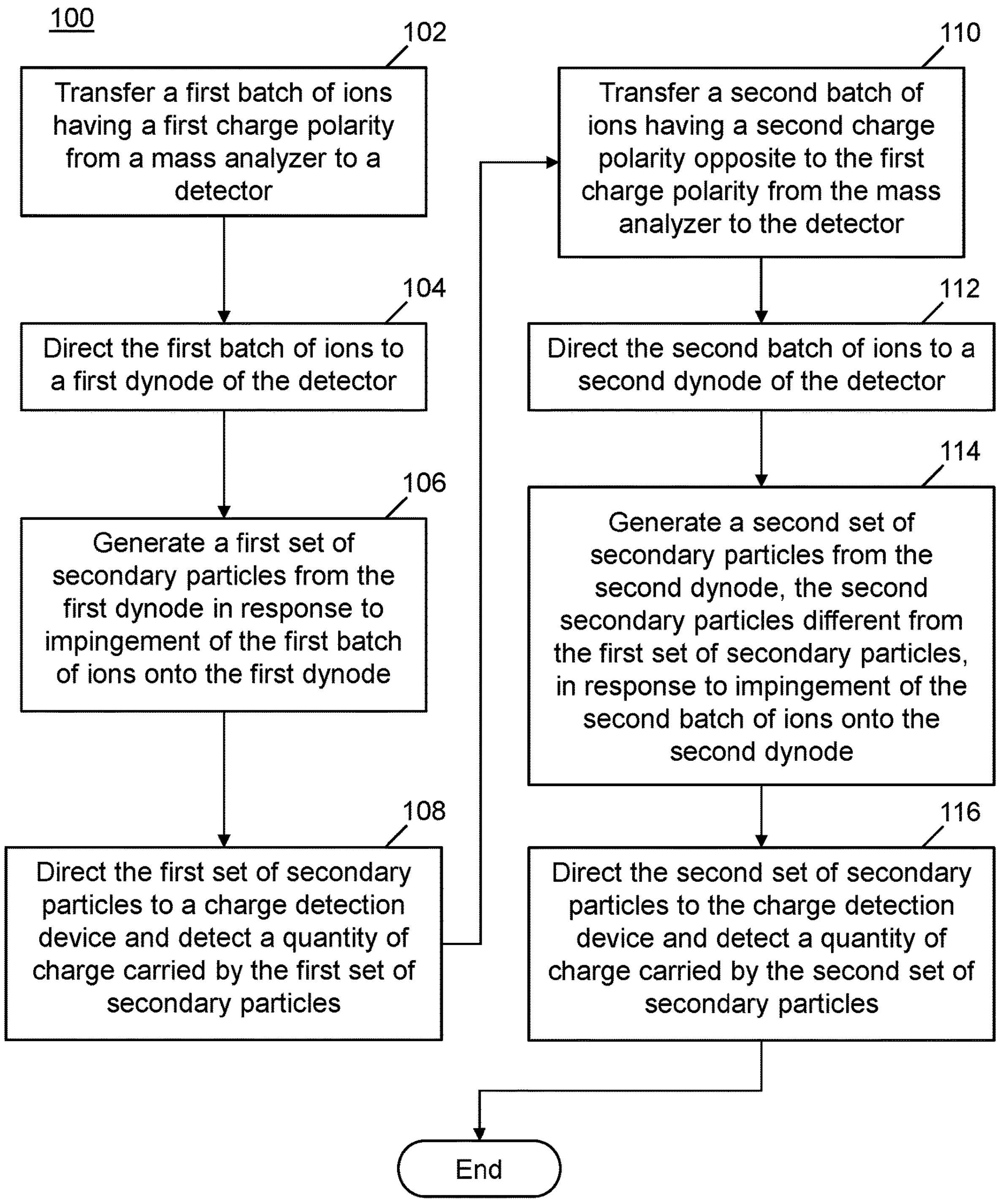
FIG. 7 is a flow diagram of a method of operating a mass spectrometer in accordance with the present teachings.

FIG. 7 is a flow diagram of a method of operating a mass spectrometer in accordance with the present teachings. Although FIG. 7 shows illustrative operations according to one method embodiment, it should be kept in mind that other embodiments may omit, add to, reorder, and/or modify one or more of the operations shown in FIG. 7. In the first step, step 102 of the method 100, a first batch of ions having a first charge polarity is transferred to a dual-polarity ion detector, such as the detector 20, from a mass analyzer. In subsequent step 104, the first batch of ions is directed to a first dynode of the detector. Preferably, the batch of ions is automatically directed to the first dynode in the absence of polarity switching of a voltage applied to the dynode or to an entrance electrode of the detector. In step 106, a first set of secondary particles is generated from the first dynode in response to impingement of the first batch of ions onto the first dynode. For example, if polarity of the first batch of ions is positive, then the secondary particles are electrons and if the polarity of the first batch of ions is negative, the secondary particles are positive ions. In step 108, the first set of secondary particles generated from the first dynode is directed to a charge detection device which detects a quantity of charge carried by the first set of secondary particles. Preferably, the directing of the first set of secondary particles to the charge detection device occurs automatically in the absence of any switching of voltage applied to the dynode, to the charge detection device or to a lens adjacent to an entrance aperture of the charge detection device.

Steps 110-116 relate to analysis of a second batch of ions and are analogous to the steps 102-108 except that the ions of the second batch of ions have a second charge polarity opposite to the charge polarity of the first batch. In step 110, the second batch of ions is transferred from the mass analyzer to the dual-polarity detector. Then, in step 112 the second batch of ions is directed to a second dynode of the detector. Preferably, the directing of the second batch of ions to the second dynode occurs automatically, in the absence of any switching of voltage polarity switching, subsequent to the detection of the first batch of ions, of the voltage applied to the dynode or of the voltage applied to the entrance electrode of the detector. In step 114, a second set of secondary particles is generated from the second dynode, the second secondary particles being different from the first set of secondary particles, in response to impingement of the second batch of ions onto the second dynode. For example, if the first set of secondary particles comprises electrons, then the second set of secondary particles comprises positive ions and vice versa. Finally, in step 116, the second set of secondary particles is directed to the charge detection device and a quantity of charge carried by the second set of secondary particles is detected. Preferably, the directing of the second set of secondary particles to the charge detection device occurs automatically in the absence of any voltage polarity switching, subsequent to the detection of the first batch of ions, of the voltage applied to either of the dynodes or of a voltage applied to the charge detection device or to any ion lens adjacent to the charge detection device.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

The discussion included in this application is intended to serve as a basic description. The present invention is not intended to be limited in scope by the specific embodiments described herein, which are intended as single illustrations of individual aspects of the invention, and functionally equivalent methods and components are within the scope of the invention. Various other modifications of the invention, in addition to those shown and described herein will become apparent to those skilled in the art from the foregoing description and accompanying drawings. Such modifications are intended to fall within the scope of the appended claims. For example, certain features of one embodiment described herein may be combined with or substituted for features of another embodiment described herein. The description and drawings are accordingly to be regarded in an illustrative rather than a restrictive sense. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A dual polarity ion detector comprising:

an entrance electrode disposed to receive a stream of ions received from a single ion outlet of a mass analyzer, the entrance electrode maintained at a reference voltage, $V_0$;

a first dynode and a second dynode;

a shielding electrode disposed between the first and second dynodes;

a first power supply that is configured to maintain the first dynode at a voltage, $V_1$, that is negative relative to $V_0$, whereby substantially positive ions of the stream of ions are directed from the entrance electrode to the first dynode;

a second power supply that is configured to, simultaneously with the maintaining of the first dynode at the voltage $V_1$, maintain the second dynode at a voltage, $V_2$, that is positive relative to $V_0$, whereby substantially negative ions are directed from the entrance electrode to the second dynode; and an ion detector comprising an entrance aperture and configured to receive and detect substantially secondary electrons from the first dynode and to receive and detect substantially secondary positive ions from the second dynode;

wherein either the first or second power supplies or one or more additional power supplies are configured to maintain the entrance aperture of the ion detector at a voltage, $V_{aperture}$, that is intermediate between the voltage, $V_1$, and the voltage, $V_2$.

2. A dual polarity ion detector as recited in claim 1, wherein the entrance electrode comprises an ion focusing lens.

3. A dual polarity ion detector as recited in claim 1, wherein the reference voltage, $V_0$, is a ground potential.

4. A dual polarity ion detector as recited in claim 1, wherein each of the first dynode and the second dynode comprises a respective concave surface that faces the ion detector.

5. A dual polarity ion detector as recited in claim 1, wherein the ion detector is an electron multiplier.

6. A dual polarity ion detector as recited in claim 1, further comprising a lens electrode disposed between ion detector and each of the first and second dynodes.

7. A dual polarity ion detector as recited in claim 1, wherein the shielding electrode is disposed midway between the first and second dynodes.

8. A dual polarity ion detector as recited in claim 1, wherein the shielding electrode is maintained at ground potential.

9. A mass spectrometer sub-system comprising:

a mass analyzer; and at least one dual polarity ion detector configured to receive ions from the mass analyzer, each of the at least one dual polarity ion detector comprising:

an entrance electrode disposed to receive a stream of the ions received from a single ion outlet of the mass analyzer and maintained at a reference voltage, $V_0$;

a first dynode and a second dynode;

a shielding electrode disposed between the first and second dynodes;

a first power supply that is configured to maintain the first dynode at a voltage, $V_1$, that is negative relative to $V_0$, whereby substantially positive ions of the stream of ions are directed from the entrance electrode to the first dynode;

a second power supply that is configured to, simultaneously with the maintaining of the first dynode at the voltage $V_1$, maintain the second dynode at a voltage, $V_2$, that is positive relative to $V_0$, whereby substantially negative ions are directed from the entrance electrode to the second dynode; and an ion detector comprising an entrance aperture and configured to receive and detect substantially secondary electrons from the first dynode and to receive and detect substantially secondary positive ions from the second dynode;

wherein either the first or second power supplies or one or more additional power supplies are configured to maintain the entrance aperture of the ion detector at a voltage, $V_{aperture}$, that is intermediate between the voltage, $V_1$, and the voltage, $V_2$.

10. A dual polarity ion detector as recited in claim 1, wherein the dual polarity ion detector is configured to, in operation, receive ions ejected from a single ion ejection slot of a linear ion trap mass analyzer, the ion ejection slot being one of a pair of diametrically opposed ion ejection slots of said mass analyzer.

11. A dual polarity ion detector as recited in claim 10, further comprising an ion focusing lens disposed between the ion ejection slot and the entrance electrode.

* * * * *